(12) United States Patent
Charas

(10) Patent No.: US 6,549,531 B1
(45) Date of Patent: Apr. 15, 2003

(54) MULTI-CELL TDMA RADIO COMMUNICATION THROUGH LIMITED SUBSETS OF TIME SLOTS

(75) Inventor: Philippe Charas, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/312,704

(22) Filed: May 17, 1999

(30) Foreign Application Priority Data

May 18, 1998 (EP) .............................. 98201641

(51) Int. Cl.$^7$ .............. H04J 4/00; H04Q 7/20
(52) U.S. Cl. .............. 370/347; 370/337; 370/335
(58) Field of Search .............. 370/347, 337, 370/335

(56) References Cited

U.S. PATENT DOCUMENTS

| 5,515,366 A | * | 5/1996 | Chieu et al. ............... 370/347 |
| 6,091,936 A | * | 7/2000 | Chennakeshu et al. ...... 370/337 |
| 6,434,183 B1 | * | 8/2002 | Kockmann et al. ......... 370/337 |
| 6,438,142 B1 | * | 8/2002 | Bousquet ................. 370/335 |

FOREIGN PATENT DOCUMENTS

| EP | 0 444 841 A2 | 9/1991 |
| EP | 0 662 772 A2 | 7/1995 |
| WO | WO 91/01073 | 1/1991 |
| WO | WO 93/17507 | 9/1993 |
| WO | WO 93/22849 | 11/1993 |
| WO | WO 95/16332 | 6/1995 |
| WO | WO 96/41493 | 12/1996 |
| WO | WO 97/13353 | 4/1997 |

OTHER PUBLICATIONS

*Novel Radio Access Principles Useful for Third Generation Mobile Radio Systems*, The Third IEEE International Symposium on Personal, Indoor and Mobile Radio Communications, Dag Åkberg, Oct. 19–21, 1992.

* cited by examiner

*Primary Examiner*—Thanh Cong Le
*Assistant Examiner*—Alan T. Gantt (57) ABSTRACT

A Time Division Multiple Access (TDMA) radio communication system, comprising radio access units or radio base stations arranged to provide duplex radio communication with remote radio communication devices in geographically limited areas or cells through a plurality of receive and transmit time slots grouped in frames. The radio communication system is arranged to provide radio communication in a cell through a limited subset of the plurality of receive and transmit time slots of a frame. In a radio communication system comprising a multiple of RF carriers, the system may be arranged to provide radio communication in a cell through a limited subset of said plurality of receive and transmit time slots of frames at different carriers.

26 Claims, 4 Drawing Sheets

MULTI-CELL TDMA RADIO COMMUNICATION THROUGH LIMITED SUBSETS OF TIME SLOTS

This application claims priority under 35 U.S.C. §§119 and/or 365 to 98201641.2 filed in Europe on May 18, 1998; the entire content of which is hereby incorporated by reference.

FIELD OF THE INVENTION

The present invention relates to multi-cell wireless radio telecommunication systems and, more particularly, to indoor cellular radio telecommunication systems and radio network planning.

BACKGROUND OF THE INVENTION

Time Division Multiple Access (TDMA) radio communication systems, such as microcell cellular radio communication systems operating in accordance with the Global System for Mobile communication (GSM), for example, comprise a plurality of radio access units or radio base stations. Each providing service to a relatively small area or cell, generally having a radius of 10–100 m indoor and uptil 500 m outdoor.

The radio access units operatively connect to a central interface unit, also called Radio Exchange (RE) or Base Station Controller (BSC) which, in turn, connects to a Private Automatic Branch exchange (PABX), the Public Switched Telephone Network (PSTN) or the Integrated Service Digital Network (ISDN), for example. In GSM the BSCs connect through an intermediate Mobile service Switching Centre (MSC) to the PSTN, ISDN etc.

Between the radio access units and remote radio communication devices or subscriber units, such as mobile radio telephones of a TDMA radio communication system a duplex radio link can be established, generally occupying a pair of receive and transmit time slots grouped in a frame. A duplex radio link is established through a first time slot or transmission burst in a frame for downlink transmissions, i.e. from the radio access units to the remote radio communication devices, and a second time slot in the same frame for uplink transmissions, i.e. from the remote radio communication devices to the radio access units.

A GSM frame comprises 8 time slots, providing 4 full-rate radio links per carrier. In addition to these full-rate radio links, subrate transmission channels have been defined, the transmission capacity of which is a fraction of the transmission capacity of a full-rate time slot. Eight-rate traffic channels are specified and used for signalling, also called Stand-alone Dedicated Control CHannels (SDCCH).

GSM operates following a combination of Time and Frequency Division Multiple Access (TDMA/FDMA). The FDMA part involves the division by frequency of the Radio Frequency (RF) bandwidth into multiple carrier frequencies. In GSM, one or more carrier frequencies are assigned to each base station, and each of the carrier frequencies is divided in time using a TDMA scheme as disclosed above.

In practice, in particular at radio access units for indoor use, i.e. in cordless and microcell cellular (GSM) radio communication systems, very often not all the available time slots are used. In order to provide sufficient coverage for economic use of the time slots and the base station equipment involved, the RF transmission power of a radio access unit has to be increased to extend the coverage area or cell to service a larger number of radio communication devices. However, increased RF power creates interference in neighbouring cells, such that a strict frequency planning is required and, if applicable, measures have to be taken in order to reduce such interference.

International patent application WO 91/01073 discloses a cellular radio system wherein the cells are sub-divided in sectors, with each sector in a cell being served by one or more radio channels on a different carrier frequency or group of carrier frequencies to the rest of the sectors within the cell. The different sectors of the cell share time slots which can be assigned on demand to the sectors. With this dynamic assignment of common time slots, the communication capacity of a cell is more evenly spread over the sectors.

European patent application 0 444 841 likewise discloses a cellular radio system wherein time slots of a TDMA frame are fixedly or dynamically shared between adjacent sectors of a cell.

Although these known time slot sharing schemes enable balancing or evening of the net nominal system capacity in a cell and/or allocation of the available channel capacity to meet time-of-day capacity needs and the like, the cells and/or sectors are planned based on traditional RF carrier frequency re-use schemes.

SUMMARY OF THE INVENTION

It is an object of the present invention to provide a multicell TDMA radio communication system and equipment, in particular for but not limited to indoor use, providing a very efficient use of the available transmission capacity.

These and other objects and advantages are achieved by the present invention in a Time Division Multiple Access (TDMA) radio communication system, comprising radio access units or radio base stations arranged to provide duplex radio communication with remote radio communication devices in geographically limited areas or cells through a plurality of receive and transmit time slots grouped in frames.

In accordance with the invention, the radio communication system is arranged to provide radio communication in a cell through a limited subset of the plurality of receive and transmit time slots of a frame.

The system according to the invention limits the number of available receive and transmit time slots of a frame for communication in a particular cell, thereby providing for time slot planning instead of the well-known frequency planning widely used in GSM systems, for example.

With the invention time slots can be more effectively occupied while simultaneous interfering transmissions of radio links between cells can be prevented by an appropriate choice of the available time slots per cell. For example, in that the radiocommunication system is arranged to provide radio communication in neighbouring cells through different subsets of the plurality of receive and transmit time slots. Thereby effectively preventing interference between adjacent cells.

In accordance with a further embodiment of the invention, in a TDMA radio communication system having multiple RF carriers each of which comprising receive and transmit time slots grouped in frames, radio communication in a cell is restricted to a limited subset of the plurality of receive and transmit time slots of frames of different carriers. That is, in a cell several subsets of receive and transmit time slots can be provided, transmitted at different RF carriers.

The subsets of receive and transmit time slots available for radio communication in a cell can be adaptively selected or fixedly allocated.

In the adaptive selection embodiment of the invention, for communication in a cell, an arbitrary available subset of receive and transmit time slots is selected. Subsets of receive and transmit time slots of a particular frame already in use in neighbouring cells are prevented from selection. In practice, the occupied time slots of a frame during use in a cell may differ from time to time.

The radio communication devices can be designed for operation at the complete RF spectrum and time slots available for the radio communication system as a whole, such as with GSM, in order to provide handovers from one cell to another while the user of a radio communication device moves through the cells of the system.

In its simplest embodiment however, omitting the need for measurement and selection mechanism of time slots in the communication equipment, according to the invention, to each cell a limited subset of the plurality of receive and transmit time slots is predeterminedly allocated.

In a TDMA radio communication system operating with, say, eight receive and transmit time slots in a frame, time slots 0 and 1 can be akllocated to a first cell, time slots 2 and 3 can be allocated to a second adjacent cell, time slots 4 and 5 may be allocated to a third adjacent cell and time slots 6 and 7 can be predeterminedly allocated to a fourth neighbouring cell. Radio communication in a particular cell is only possible through the time slots allocated to such cell.

Those skilled in the art will appreciate that the latter embodiment of the invention can be easily controlled from the radio access units without requiring any control or selection mechanism in the radio communication devices.

In a minimum configuration, a subset of one pair of receive and transmit time slots of a frame is allocated to a cell. However, preferably, a subset of two pairs of receive and transmit time slots is allocated to a cell, in order to support inter and intra cell handovers.

As will be appreciated from the above, the radio communication system according to the invention can be operated in accordance with known TDMA protocols. However, the advantages of the present invention are best encountered if applied to a radio communication system operating following the GSM standard or equivalent.

A GSM radio communication terminal operating in a conventional GSM network can also operate in an (indoor) microcell cellular GSM system arranged in accordance with the present invention. The restriction of information exchange to a predetermined subset of time slots in a cell can be completely controlled through the radio access units of the system. Thereby preventing the need for so-called dual mode radio terminals, designed for outdoor operation in accordance with the GSM standard and indoor communication following a cordless radio communication standard, such as the Digital Enhanced Cordless Telecommunications (DECT) technology, for example.

In a further preferred embodiment of the radio communication system according to the invention, both the radio access units and the remote radio communication devices are arranged to operate at very low RF output power levels adapted for radio communication limited to pico cell or even nano cell ranges. That is cells having a radius of up to 10–15 meters. Contrary to the above-mentioned common approach for GSM systems, with the radio communication system according to the invention, in order to increase the communication capacity, the cell sizes are effectively decreased.

With the above low RF output power levels, it appears sufficient to allocate 2 or 3 RF carriers of a GSM radio system, for example, for indoor services throughout the GSM network as a whole.

In a preferred embodiment of the radio communication system according to the invention, a radio access unit comprises a wireless transmission interface operatively connecting to a wireless radio access controller and/or radio access exchange means. Preferably a wireless transmission interface operating in accordance with the DECT standard.

The invention further provides a radio access unit and radio communication device particularly designed for use in a TDMA radio communication system and/or a method of duplex radio communication according to the present invention.

The above-mentioned and other features and advantages of the invention will be best understood from the following description with reference to the enclosed drawings.

DETAILED DESCRIPTION OF THE EMBODIMENTS

Without the intention of a limitation, the invention will now be explained by its application in a cellular radio communication system, such as a cellular radio communication system operating in accordance with the Global System for Mobile communications (GSM) standard. However, the invention is generally applicable in Time Division Multiple Access (TDMA) radio communications systems both cellular and cordless radio communication systems, such as designated DCS 1800, PCS 1900, PDC, DECT, PHS, CT3 etc.

Figure 1:
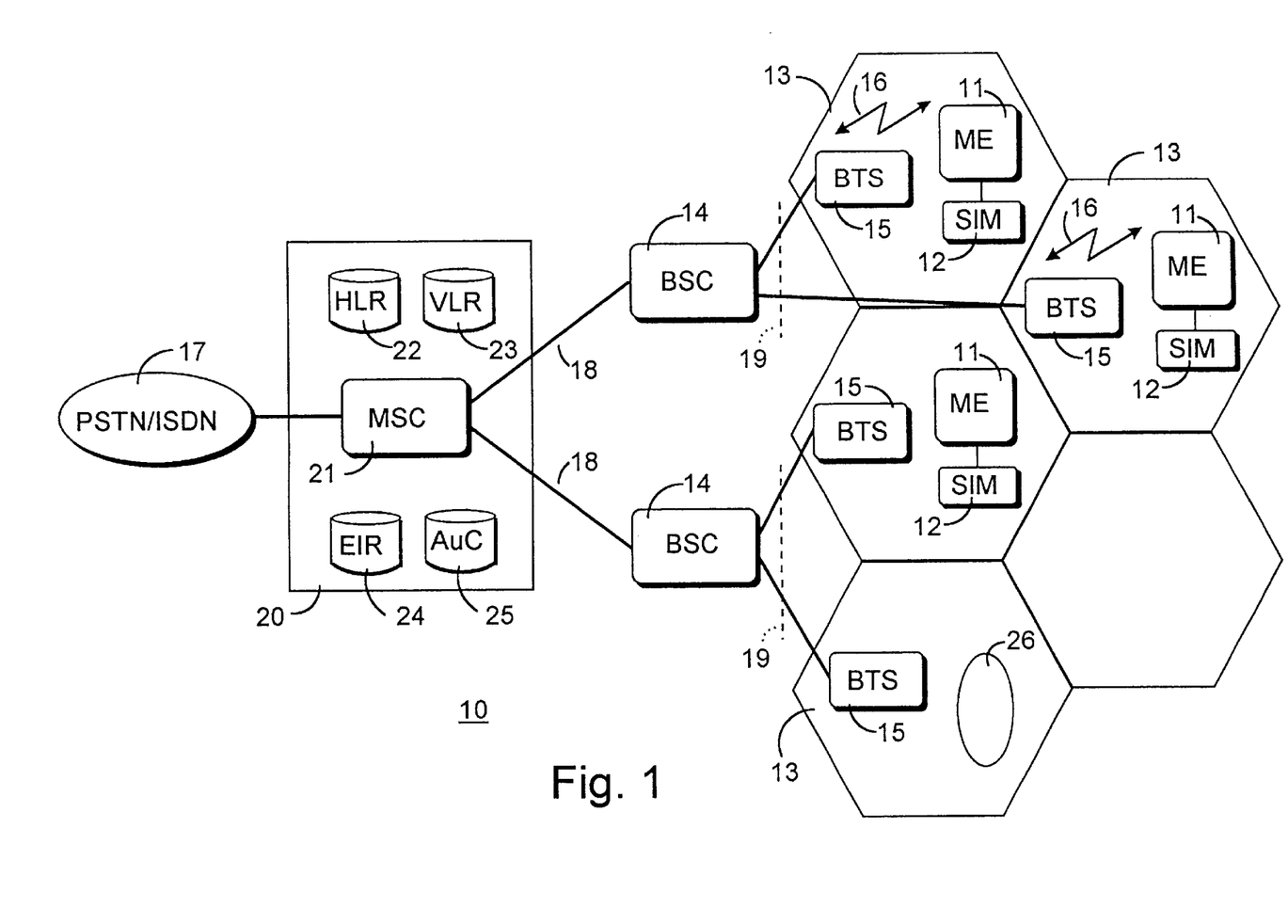
FIG. 1 shows, in a schematic and illustrative manner, a typical cellular radio telecommunication system operating in accordance with the Global System for Mobile communications.

FIG. 1 shows a typical architecture of a GSM network 10, comprising several functional entities, the functions and interfaces of which are specified in applicable protocols. The GSM network 10 can be divided into three general parts.

First, the radio communication terminals or Mobile Equipment (ME) 11 with its Subscriber Identity Module (SIM) card 12, carried by the subscriber.

Second, the radio access unit or radio base stations subsystem which controls the radio or Um-interface 16 with the mobile equipment 11. The main part of the radio base station subsystem is formed by a Base Station Controller (BSC) 14 and Base Transceiver Stations (BTSs) 15 which connect to the BSC 14.

A third and major part of the GSM network 10 is the network subsystem 20 comprising the Mobile services Switching Centre (MSC) 21, which performs the switching of calls between the radio base stations subsystems and the Public Switched Telephone Network (PSTN) or Integrated Services Digital Network (ISDN) 17.

The network subsystem 20 further comprises a Home Location Register (HLR) 22 and a Visitor Location Register (VLR) 23 which, together with the MSC 21, provide the call-routing and roaming capabilities of the GSM network 10. The HLR 22 contains all the administrative information of each subscriber registered in the GSM network 10 and the current location of the mobile equipment 11.

The VLR 23 contains selected administrative information from the HLR 22, necessary for call control and provision of the subscriber services for each mobile currently located in the geographically area controlled by the VLR 23.

For authentication and security purposes, an Equipment Identity Register (EIR) 24 and an Authentication Centra (AuC) 25 are provided in the network subsystem 20. The EIR 24 is a data base containing a list of valid mobile equipment on the network 10 and the AuC 25 is a protected data base storing a copy of the secret key of each subscriber's SIM card 12. The MSC 21 connects to the BSC 14 through a so-called A-interface 18. The BTSs 15 connect to the BSC 18 across a so-called Abis-interface 19.

Each BTS 15 provides service to a geographically limited area or cell 13. The cells 13 are arranged, such that a wide geographic area is completely covered by a plurality of adjacent cells 13.

At the radio or Um-interface 16, GSM operates following a combination of Time and Frequency Division Multiple Access (TDMA/FDMA). The FDMA part involves the division by frequency of the available transmission bandwidth into a plurality of Radio Frequency (RF) carriers. One or more carrier frequencies are assigned to each BTS 15, such that no or little interference occurs between communications in adjacent or neighbouring cells 13. Those skilled in the art will appreciate that the frequency planning of a GSM network is a very complicated and sensitive issue. Each of the carriers is further divided in time, using a TDMA scheme as illustrated in FIG. 2.

Figure 2:
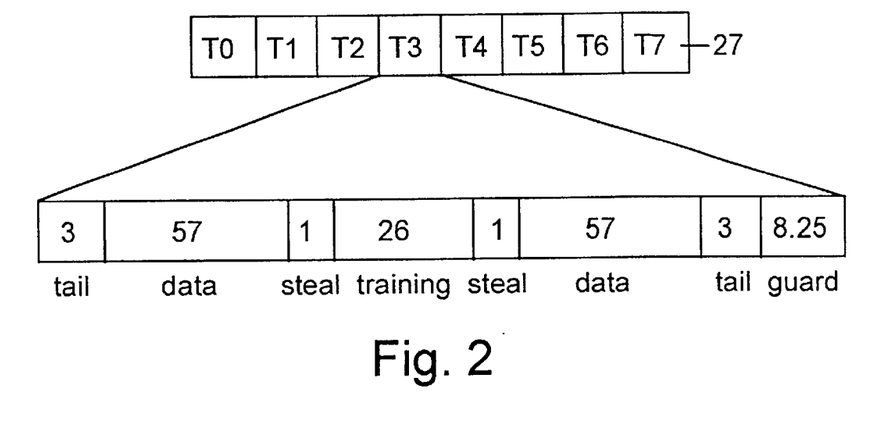
FIG. 2 shows, in a schematic and illustrative manner, a typical TDMA frame and, in more detail, the organisation of a time slot.

The fundamental unit of time in the TDMA scheme of FIG. 2 is called a burst period or time slot T0, T1, . . . , T7. Eight time slots are grouped into a TDMA frame 27. Further, each time slot forms a physical or communication channel per TDMA frame. Duplex transmission between a BTS 15 and ME 11 comprises two time slots separated in time by 3 burst periods or time slots, so that the ME 11 does not have to transmit and receive simultaneously, thus simplifying the electronics.

A typical bit organisation of a time slot is shown for time slot T3. For speech the time slots, in their data bits part, carry traffic from two different speech samples.

To minimize co-channel interference and to conserve power, both the MEs 11 and the BTSs 15 operate at a lowest power level that will maintain an acceptable signal quality. According to their peak RF transmitter power, there are five classes of MEs defined, rated at 20, 8, 5, 2 and 0.8 watts.

With the increased popularity and use of mobile radio telephone and data transmissions, there is a growing need for using the same mobile equipment both for outdoor as well as indoor communication. Using current GSM equipment for indoor communications, in order to provide sufficient indoor coverage for economic use of the available time slots in a frame, relatively large cells have to be created, whereas the number of RF carriers that can be used is limited, due to the fact that the particular indoor communication has to be treated as a sub-cell 26 of a cell 13 served by a BTS 15. In busy, crowdy areas, the cells 13 are planned in a compact manner with regard to the available RF carriers, such that there is little or no room for a number of (indoor) sub-cells 26, without creating unduly interference in other cells.

Figure 3:
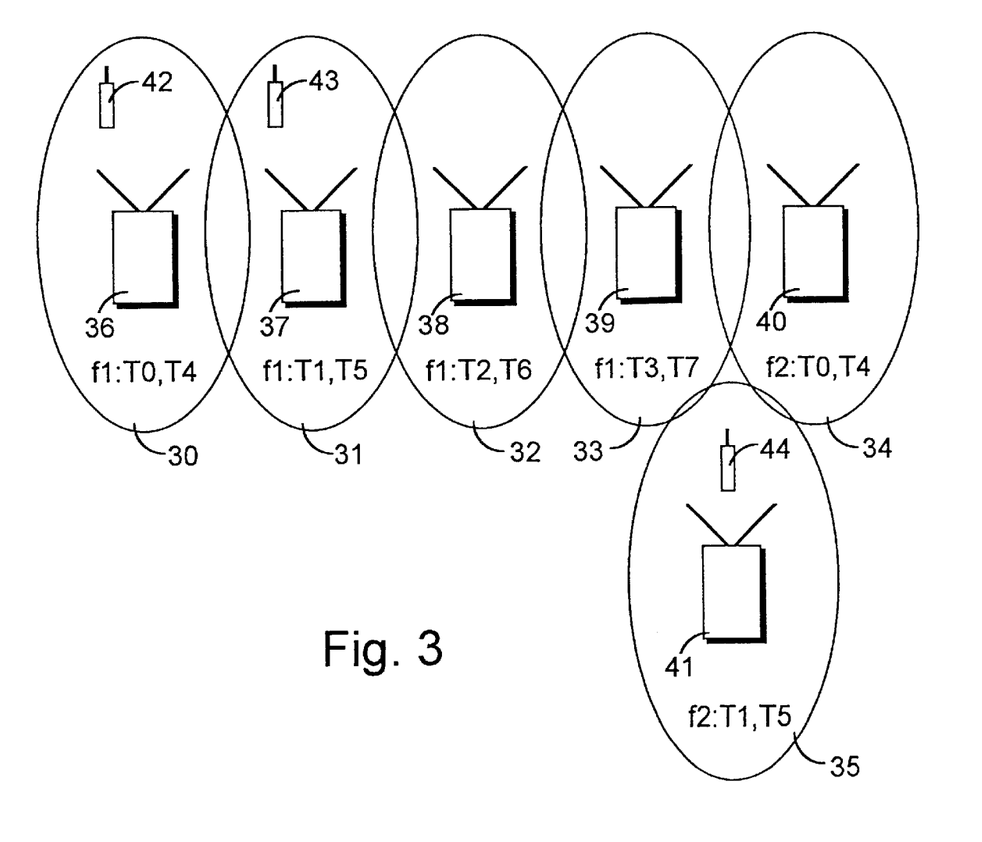
FIG. 3 shows, in a schematic and illustrative manner, a typical allocation of time slots in a radio communication system according to the present invention.

As schematically illustrated in FIG. 3, in accordance with the present invention, radio communication in a cell is limited to a subset of time slots of a frame.

FIG. 3 shows a plurality of adjacent or neighbouring cells 30–35, each serviced by a radio access unit or radio base station 36–41, respectively. In the embodiment shown, communication in each cell 30–35 is limited to one pair of receive and transmit time slots of a frame, i.e. for uplink and downlink transmissions between a radio access unit 36–41 and a remote radio communication device or ME 42, 43, 44 in a cell 30–35.

As indicated in FIG. 3, for example, communication of radio access unit 36 is limited to time slots T0 and T4 at carrier frequency f1. Radio access unit 37 may communicate during time slots T1 and T5 of the frame at carrier f1. In cell 32, radio communication is possible during time slots T2 and T6 of the frame at carrier f1 and radio access unit 39 communicates during time slots T3 and T7 of the frame at carrier frequency f1. For cell 34, radio communication is allowed during time slots T0 and T4 of the frame at carrier frequency f2 whereas for cell 35 radio access unit 41 is arranged to communicate during time slots T1 and T5 of the frame at carrier frequency f2 etc.

As can be seen from FIG. 3, instead of planning cells with regard to RF carrier frequencies as is the case for the cells 13 in FIG. 1, in the radio communication system according to the invention, cells are created using time slot planning. Although operating at the same carrier frequency f1, ME 42 in cell 30 will not interfere with ME 43 in the adjacent cell 31.

It will be appreciated by those skilled in the art that, instead of a subset of two time slots for uplink and downlink transmissions, a subset of two or more pairs of receive and transmit time slots can be allocated to a particular cell or radio access unit on the same or different carriers. In general, in the case of a predetermined fixed allocation of time slots for a particular cell, in a TDMA transmission scheme wherein a frame comprises M pairs of available time slots, N pairs of time slots are allocated to a cell such that $1 \leq N < M$. Preferably, N=2 if intra and inter cell handovers between neighbouring cells have to be supported.

For control and signal purposes, one time slot of a subset of time slots allocated to a cell can be used as a control channel, while the other is used for communication purposes. If the first slot is in operation, and a call is set up on the second (control channel) time slots, than the control channel is converted to a communication channel or traffic channel. Next, the first time slot that is released is converted to a control channel again etc. In the case of fixedly allocated time slots, conversion of control and traffic or communication channels can be established if at least two pairs of receive and transmit time slots are allocated to a particular cell.

Although FIG. 3 shows an embodiment wherein frames at several carrier frequencies are available, it will be appreciated that this is not a prerequisite. By minimizing the RF output power of the communication equipment in a particular cell, that is both the radio access units and the remote communication device, non-adjacent cells can be operated at the same frequency and time slot pairs without unduly interfering each other. For indoor applications, wherein two time slots are in most cases sufficient for a cell, a plurality of pico or nano cells can be created, each having its own radio access unit.

For example, by limiting the maximum RF output power of the radio access units and remote radio communication devices to a maximum of 0.5 mW, for example, nano cells having a radius of 10–15 meters can be created, typically covering two rooms or modules of an office. The radio access units are preferably installed, such that there is always nearly line of sight communication between a remote radio communication device and a radio access unit in a room or office module.

From the above, it will be understood that if the radio communication system according to the invention operates following the GSM protocol, the remote communication devices used in the outdoor GSM network 10 (FIG. 1) can be applied as well for indoor use with a radio communication system according to the invention, as schematically illustrated in FIG. 3. However, for operation in a radio communication system having cells operating at a very low RF output power of say 0.5 mW, the power amplifier in the remote communication device, such as a cellular radio terminal, has to be switched off or reduced to low power. This can be achieved, following the invention, by applying appropriate RF control means in both the access units 36–41 and the mobile terminals.

Instead of a predetermined, fixed allocation of time slots to a cell 30–35 as disclosed in connection with FIG. 3, the time slots in the cell may be adaptively allocated, as will be explained with reference to FIG. 4.

Figure 4:
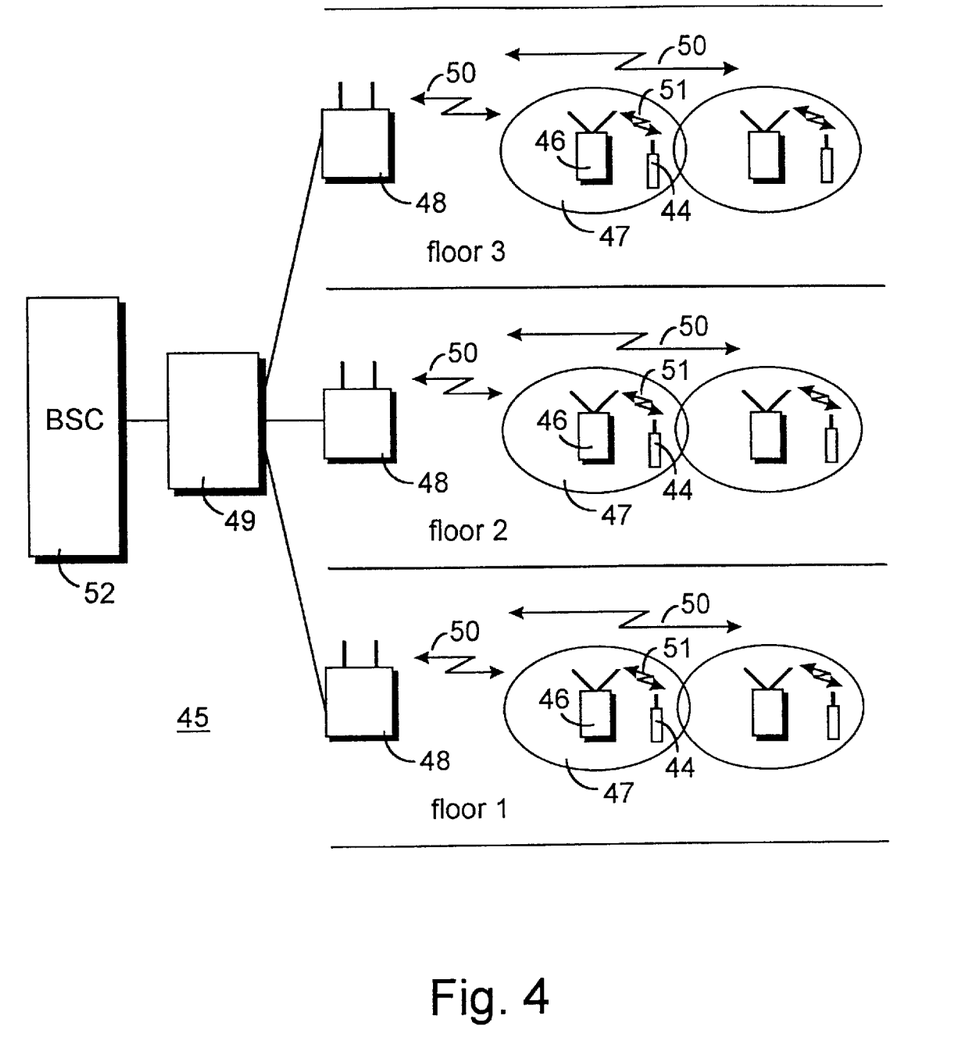
FIG. 4 shows, in a schematic and illustrative manner, an embodiment of the radio communication according to the invention arranged for indoor usage.

FIG. 4 shows a radio communication system 45 following the invention, installed in an office building comprising three floors, i.e. floor 1, floor 2 and floor 3. Each floor comprises a number of radio access units 46 associated with a cell 47. Further, at each floor one or a plurality of wireless radio access controllers 48 are provided, which connect to a local controller 49.

The radio access units 46 comprise a wireless transmission interface 50 for communication with a radio access controller 48. The radio access units 46 provide radio communication to remote radio communication devices 44 in a cell 47 via a wireless communication interface 51, e.g. following the GSM protocol.

The wireless transmission interface 50 between the radio access units 46 and the radio access controllers 48 may be of any suitable type, preferably operating in accordance with the Digital Enhanced Cordless Telecommunications (DECT) standard.

In short, DECT operates under a MC/TDMA/TDD (Multiple Carrier/Time Division Multiple Access/Time Division Duplex) protocol, wherein Dynamic Channel Allocation (DCA) is used for establishing radio links. A more elaborate discussion on DECT can be found in a paper by D. Akerberg "Novel Radio Access Principles Usufull for the Third Generation Mobile Radio Systems", the Third IEEE International Symposium on Personal, Indoor and Mobile Radio Communication, Boston, Mass., Oct. 19–21, 1992.

The local controller 49 connects to radio exchange means 52 of a radio access network, such as the BSC 14 of the GSM network 10 of FIG. 1. The local controller 49 operates as a protocol converter between the GSM network on the one hand, and the radio access controllers 48, such as operating in accordance with the DECT protocol, on the other hand. The local controller 49 is arranged to emulate a BTS of the GSM network, such as the BTS 15 (FIG. 1).

The protocol conversion required, among others, will include appropriate conversion of timing and control signals as well as adaptation of data bit rates and is regarded to be in the reach of persons skilled in the art.

Handovers between base stations or radio access units 46 are controlled by the BSC 52 in the normal manner, following the GSM protocols, whereas instructions are converted in the protocol conversion part of the local controller 49.

In the system shown in FIG. 4, the radio access units 46 can be of a very simple type, having the size of a match box, and can be placed at an office desk or wall mounted. Through the radio interface 50 a wireless connection is provided with a radio access controller 48, providing a very easy and simple installation. In practice, a floor typically may be equipped with 30 to 50 or even more radio access units 46.

As disclosed in connection with FIG. 3, the radio access units 46 may be arranged such to transmit through a fixed subset of full or sub-rate time slots of a frame. However, through the local controller 49 adaptive selection of time slots can be achieved. That is, once a pair of time slots of a frame is occupied by a radio access unit 46, the local controller 49 prevents occupation of the same time slot pair in an adjacent cell.

As can be seen from FIG. 4, by an appropriate allocation of the subsets of time slots available for a cell, in a low power mode, one carrier frequency for the system as a whole could be sufficient. In practice, however, a GSM operator, for example, may allocate two or three radio frequencies particularly for microcell cellular systems for indoor and (limited) outdoor usage operating in accordance with the present invention.

Those skilled in the art will appreciate that this a very advantage approach, in that by reserving such a limited number of frequencies for indoor usage in an overall GSM network, co-channel interference in pico and nano cells overlaid by a macro cell can be effectively avoided.

Although a DECT transmission interface between the radio access units 46 and the radio access controllers 48 is preferred in view of the dynamic channel control algorithm of the DECT system, by which the radio access units 46 are connected "on demand", other transmission interfaces whether wired or wireless, such as a wired or wireless Local Area Network (LAN), can be used as well.

Figure 5:
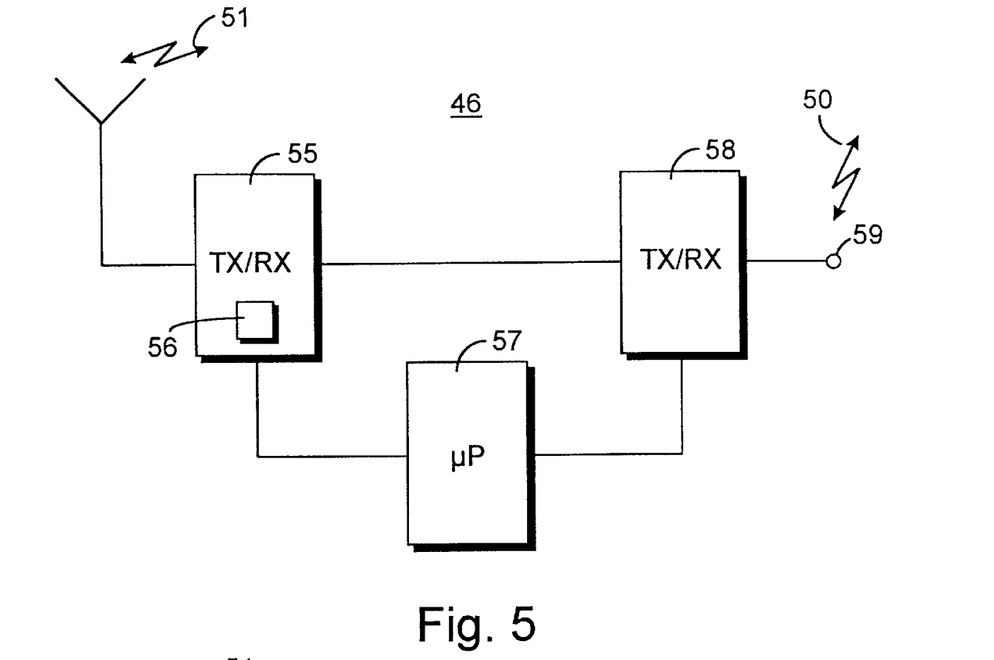
FIG. 5 shows a simplified block diagram of an embodiment of a radio access unit operating in accordance with the present invention.

FIG. 5 shows, in a simple block diagram, a radio access unit, such as a radio access unit 46, in accordance with the present invention.

The transceiver part 55, for example, may be arranged as a two-time slot, single carrier transceiver, operable at any time slot of a frame and any RF carrier available to a communication system or, a limited number of RF carriers, such as RF carriers particularly designated for indoor use, for example. A typical output power is 0.5 mW for indoor use in pico-cell and nano cell environments. An extra receive function 56 is provided in order to monitor traffic at the air interface 51. Physically, this can be implemented with the receiver already used for communication purposes. Control means 57 provide a suitable algorithm, managing the selection of time slots and frequencies, as disclosed above. The control means 57 generally comprise a microprocessor or microcontroller. Transmission interface means 58, 59, preferably wireless transmission interface means 50 operating in accordance with the DECT protocol, operatively connects the radio access unit 46 through the intermediate radio access controller 48 to the local controller 49. However, the transmission interface 59 may also be designed for wired or wireless communication through a suitable LAN protocol, for example.

Figure 6:
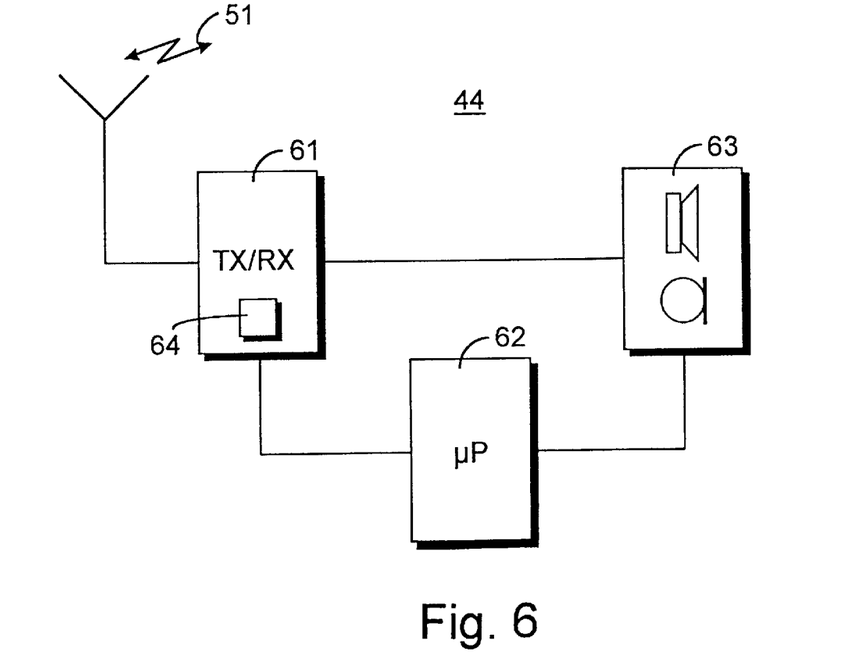
FIG. 6 shows a simplified block diagram of an embodiment of a remote radio communication device for operation in radio communication system according to the present invention.

FIG. 6 shows a block diagram of a remote communication device 44 for use with a radio communication system according to the invention, comprising transceiver means 61, control means 62 including a microprocessor or microcontroller and information exchange means 63. The information exchange means 63 may comprise, for example, a microphone and loudspeaker part for radio telephone purposes, display means, keyboard means and databus means. The control means may be arranged for communication at a limited subset of time slots of a TDMA frame or frames.

In accordance with the present invention, RF control means 64 are provided, operatively connecting to the transceiver means for limiting the RF output power of the remote radio communication device 60 responding to a low power indoor radio communication system according to the invention.

Note that the radio communication system according to the invention is not limited to radio terminal devices having low RF output power, but can be used with conventional mobile radio telephones, such as GSM radio telephones, maintaining the advantages of improved indoor communication without requiring dual mode radio communication devices.

What is claimed is:

1. A Time Division Multiple Access (TDMA) radio communication system, comprising:
   radio access units or radio base stations configured to provide duplex radio communication with remote radio communication devices in geographically limited areas or cells through a plurality of receive and transmit time slots grouped in frames,
   said radio communication system being configured to provide radio communication in a first cell through a limited subset of the plurality of receive and transmit time slots of a frame, and being configured to provide radio communication in cells neighboring the first cell through different subsets of the plurality of receive and transmit time slots.

2. The TDMA radio communication system according to claim 1, having multiple radio frequency (RF) carriers each comprising receive and transmit time slots grouped in frames, wherein said radio communication system is configured to provide radio communication in the first cell through a limited subset of the plurality of receive and transmit time slots of frames at different carriers.

3. The TDMA radio communication system according to claim 1, arranged for adaptively selecting a limited subset of receive and transmit time slots.

4. The TDMA radio communication system according to claim 1, arranged to provide radio communication in the first cell through a limited subset of receive and transmit time slots predeterminedly allocated to said cell.

5. The TDMA radio communication system according to claim 1, wherein a frame includes M pairs of receive and transmit time slots, and each subset includes N pairs of receive and transmit time slots, wherein M and N are integers, and $1 \leq N < M$.

6. The TDMA radio communication system according to claim 5, wherein N=2.

7. The TDMA radio communication system according to claim 1, wherein said radio access units are arranged to receive and transmit at predetermined radio frequency (RF) carriers.

8. The TDMA radio communication system according to claim 1, wherein said receive and transmit time slots are receive and transmit time slots in accordance with the Global System for Mobile communications (GSM) and its derivatives, including sub-rate time slots.

9. The TDMA radio communication system according to claim 8, wherein said radio communication system is arranged to provide radio communication in a cell using at least one common control channel.

10. The TDMA radio communication system according to claim 9, wherein the receive and transmit time slots are adaptively arranged as a communication channel and as a control channel.

11. The TDMA radio communication system according to claim 1, wherein said radio access units and remote radio communication devices are arranged to provide radio communication at radio frequency (RF) output power levels limited to pico cell/nano cell ranges.

12. The TDMA radio communication system according to claim 11, wherein said radio access units and remote radio communication devices include RF power control means arranged to control the RF output power of the remote radio communication devices, thereby providing radio communication at RF output power levels limited to pico cell/nano cell ranges.

13. The TDMA radio communication system according to claim 1, further comprising a radio access controller for managing the radio access units, wherein the radio access units include a wired and/or wireless transmission interface for operatively connecting to the radio access controller, wherein the wireless transmission interface operates in accordance with the Digital Enhanced Cordless Telecommunications (DECT) standard.

14. A radio access unit for use in a Time Division Multiple Access (TDMA) radio communication system, said radio communication system providing duplex radio communication with remote radio communication devices in geographically limited areas or cells, said radio access unit comprising:
   at least one transceiver for providing radio communications through a plurality of receive and transmit time slots grouped in frames of at least one radio frequency (RF) carrier; and
   control means for operatively providing the radio communications through a first limited subset of the plurality of receive and transmit time slots in a first area, and through a second limited subset of the plurality of receive and transmit time slots in a second, neighboring, area.

15. The radio access unit according to claim 14, wherein said control means is operatively arranged to adaptively select limited subsets of receive and transmit time slots for communications in the first and second areas.

16. The radio access unit according to claim 14, wherein said control means is operatively arranged to utilize predetermined limited subsets of receive and transmit time slots for communications in the first and second areas.

17. The radio access unit according to claim 14, further comprising a wireless transmission interface means for operatively connecting the radio access unit to the control means.

18. The radio access unit according to claim 17, wherein said wireless transmission interface means operates in accordance with the Digital Enhanced Cordless Telecommunications (DECT) standard.

19. A remote radio communication device for use in a Time Division Multiple Access (TDMA) radio communication system, said radio communication system providing duplex radio communication with remote radio communication devices in geographically limited areas or cells, said remote radio communication device comprising:

a transceiver for providing radio communications at a controlled RF output power through a plurality of receive and transmit time slots grouped in frames of at least one radio frequency (RF) carrier; and control means for controlling the transceiver and operatively providing radio communications through a limited subset of the plurality of receive and transmit time slots, said control means controlling the RF output power of the transceiver to provide radio communications limited to pico cell/nano cell ranges.

20. A method of providing duplex radio communications in geographically limited areas or cells through a plurality of receive and transmit time slots grouped in frames in accordance with a Time Division Multiple Access (TDMA) radio communication protocol, said method comprising the steps of:

configuring radio access units or radio base stations to provide duplex radio communication with remote radio communication devices in geographically limited areas or cells through a plurality of receive and transmit time slots grouped in frames;

providing the radio communications in a first cell through a first limited subset of the plurality of receive and transmit time slots of a frame; and providing radio communications in cells neighboring the first cell through different subsets of the plurality of receive and transmit time slots.

21. The method according to claim 20, wherein the duplex radio communications are established through multiple radio frequency (RF) carriers, each comprising receive and transmit time slots grouped in frames, wherein the radio communications in each cell are established through a limited subset of receive and transmit time slots of frames at different carriers.

22. The method according to claim 20, further comprising the step of adaptively selecting the limited subsets of receive and transmit time slots.

23. The method according to claim 20, wherein a predetermined limited subset of receive and transmit time slots is allocated to each cell.

24. The method according to claim 20, wherein the duplex radio communications are provided at radio frequency (RF) output power levels that are limited to pico cell/nano cell ranges.

25. The method according to claim 24, further comprising exchanging an RF output power control signal for reducing the RF output power levels of remote radio communication devices operating in a cell.

26. The method according to claim 20, wherein a frame includes M pairs of receive and transmit time slots, and each subset includes N pairs of receive and transmit time slots, wherein M and N are integers, and $1 \leq N < M$.

* * * * *